(12) United States Patent
Waineo

(10) Patent No.: US 10,906,145 B2
(45) Date of Patent: Feb. 2, 2021

(54) DRIVELINE TEST FIXTURE HAVING COMPLIANT COLLAR

(71) Applicant: American Axle & Manufacturing, Inc., Detroit, MI (US)

(72) Inventor: Bryan N. Waineo, Northville, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 482 days.

(21) Appl. No.: 15/831,421

(22) Filed: Dec. 5, 2017

(65) Prior Publication Data

US 2018/0185972 A1 Jul. 5, 2018

Related U.S. Application Data

(60) Provisional application No. 62/442,515, filed on Jan. 5, 2017.

(51) Int. Cl.
*B23Q 1/70* (2006.01)
*G01M 13/021* (2019.01)
*G01M 13/028* (2019.01)

(52) U.S. Cl.
CPC .............. *B23Q 1/70* (2013.01); *G01M 13/021* (2013.01); *G01M 13/028* (2013.01)

(58) Field of Classification Search
CPC ........................................................ B23Q 1/70
USPC ......................................................... 73/162
See application file for complete search history.

(56) References Cited

U.S. PATENT DOCUMENTS

| | | | |
|---|---|---|---|
| 4,484,899 A | 11/1984 | Haarmann | |
| 4,804,352 A | 2/1989 | Schmidt | |
| 5,221,232 A | 6/1993 | Nameny | |
| 5,484,339 A * | 1/1996 | Birioukov | F16D 3/62 464/69 |
| 6,629,697 B1 * | 10/2003 | Asai | B23B 31/28 279/110 |
| 6,805,487 B1 * | 10/2004 | Yuasa | B23Q 11/0883 384/16 |
| 8,167,726 B2 | 5/2012 | Wormsbaecher et al. | |
| 2010/0065337 A1 * | 3/2010 | Luce | B23K 10/027 175/375 |
| 2013/0292182 A1 * | 11/2013 | Glen | E21B 4/06 175/325.1 |

FOREIGN PATENT DOCUMENTS

EP 1596083 A2 11/2005

* cited by examiner

*Primary Examiner* — Walter L Lindsay, Jr.
*Assistant Examiner* — Philipmarcus T Fadul
(74) *Attorney, Agent, or Firm* — Burris Law, PLLC

(57) ABSTRACT

A spindle assembly for conducting transmission error testing between an input pinion with a ring gear of an axle assembly. The spindle assembly includes a spindle, which is rotatably disposed about a spindle axis, a collet assembly, which has a collet that is rotatably disposed about a collet axis, and a compliant coupling that couples the spindle and the collet assembly together for common rotation. The compliant coupling includes a first coupling member, which is fixedly coupled to the spindle, a second coupling member, which is fixedly coupled to the collet assembly, a pivot plate, a pair of first link arms and a pair of second link arms. The opposite ends of each first link arm are pivotably coupled to the first coupling member and the pivot plate. The opposite ends of each second link arm are pivotably coupled to the second coupling member and the pivot plate.

8 Claims, 6 Drawing Sheets

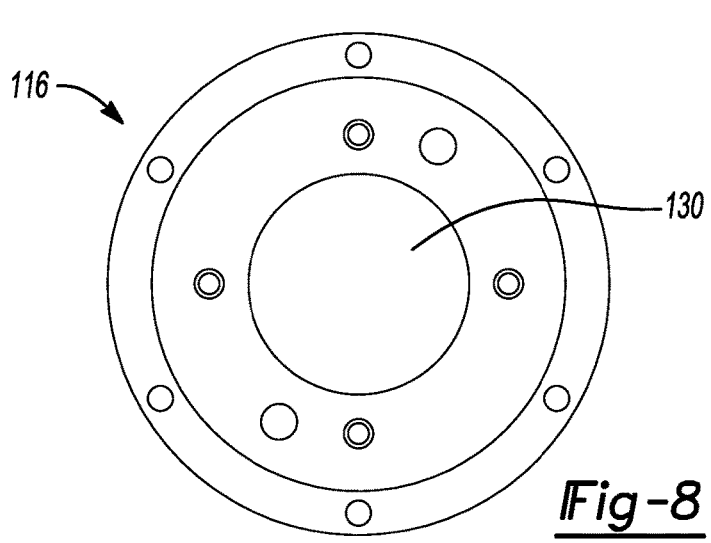
Fig-8
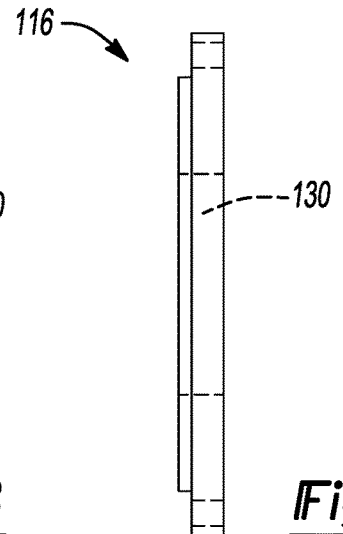
Fig-9
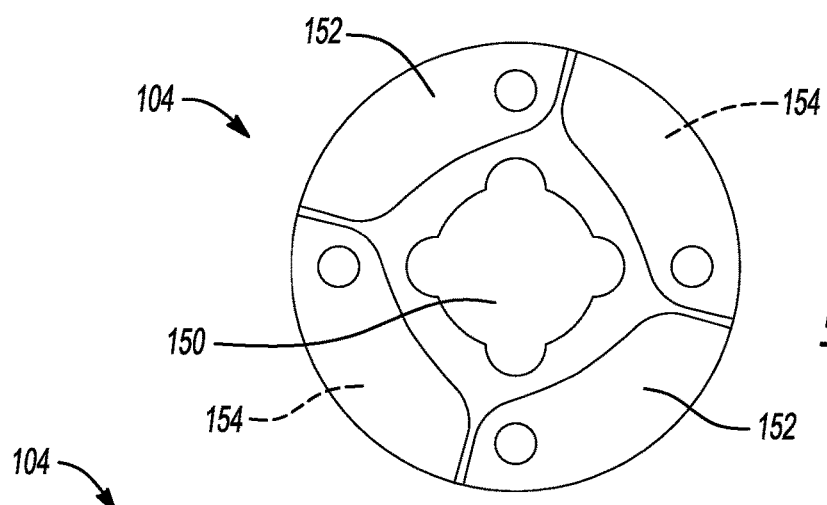
Fig-10
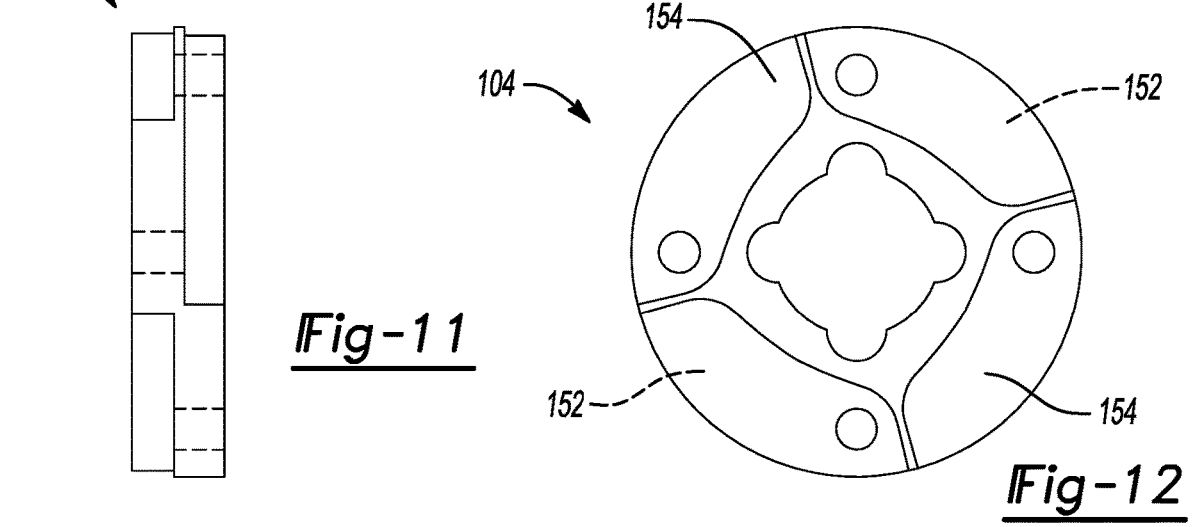
Fig-11
Fig-12

DRIVELINE TEST FIXTURE HAVING COMPLIANT COLLAR

FIELD

The present disclosure relates to a driveline test fixture having a compliant collar.

BACKGROUND

Transmission error between the input pinion and the ring gear in an axle assembly is a known source of noise and vibration in an automotive vehicle. There is a need in the art for the measurement of transmission error in a manner that is not only highly accurate and highly repeatable, but which can be performed in an automated and relatively quick manner.

In the manufacture of axle assemblies, it is known to conduct a test for transmission error between the input pinion and a ring gear using a test fixture having an electric motor, which is configured to drive an input pinion of the axle assembly, and a spindle assembly having an encoder and a collet assembly. The collet assembly is configured to engage a differential case of the axle assembly. Rotation of the input pinion via the electric motor drives a ring gear of the axle assembly, as well as the differential case, which is fixedly coupled to the ring gear. Rotation of the ring gear and differential case is primarily a function of the gear ratio that is provided by the input pinion and the ring gear, but is also affected by transmission error. The encoder of the spindle assembly is configured to generate rotational position data that is correlated to the rotational position of the input pinion. In this regard, the collet assembly is configured to engage the differential case and the encoder is configured to measure rotation of the collet assembly during a transmission error test.

When testing for transmission error, forces can be generated due to relatively small amounts of misalignment between the rotational axis of the differential case and the rotational axis of the collet assembly that result in relative motion between the encoder and the differential case. This relative motion lessens both the accuracy and repeatability of the transmission error measurement. Accordingly, there remains a need in the art for an improved spindle assembly.

SUMMARY

This section provides a general summary of the disclosure, and is not a comprehensive disclosure of its full scope or all of its features.

In one form, the present teachings provide a spindle assembly that includes a frame, a spindle coupled to the frame for rotation about a spindle axis, an encoder, a collet assembly and a compliant coupling. The encoder has a stator, which is fixed to the frame, and a rotor that is coupled to the spindle for rotation therewith. The collet assembly has a collet mount, a collet, an expander, a plunger, a spring, a linear motor and a compliant coupling. The collet is fixedly coupled to the collet mount and configured to engage an inside diametrical surface of a differential case. The collet defines a collet axis and a plurality of collet fingers that are movable between a radially inward position and a radially outward position that is radially outward of the radially inward position. The expander is slidably received in the collet and movable along the collet axis between a first expander position, in which the expander and the collet cooperate to position the collet fingers in the radially outward position, and a second expander position, in which the expander and the collet cooperate to position the collet fingers in the radially inward position. The plunger is coupled to the expander for movement therewith along the collet axis. The spring is disposed between the plunger and the collet mount and biases the expander toward the first expander position. The linear motor has a motor output member that is configured to move the expander from the first expander position to the second expander position. The compliant coupling includes a first coupling member, which is fixedly coupled to the spindle, a second coupling member, which is fixedly coupled to the collet mount, a pivot plate, a pair of first link arms and a pair of second link arms. Each of the first link arms has a first end, which is pivotably coupled to the first coupling member, and a second end opposite the first end that is pivotably coupled to a first side of the pivot plate. Each of the second link arms has a third end, which is pivotably coupled to the second coupling member, and a fourth end opposite the third end that is pivotably coupled to a second side of the pivot plate opposite the first side. Each of the second link arms is disposed circumferentially about the pivot plate between the pair of first link arms. At least one of the plunger and the motor output member is received in the compliant coupling.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 8 is a rear elevation view of a portion of the spindle assembly of FIG. 1, illustrating an annular flange of the compliant coupling;

FIG. 9 is a side elevation view of the annular flange;

FIG. 10 is a rear elevation view of a portion of the spindle assembly of FIG. 1, illustrating a pivot plate of the compliant coupling;

FIG. 11 is a side elevation view of the pivot plate;

FIG. 12 is a front elevation view of the pivot plate;

DETAILED DESCRIPTION

Figure 1:
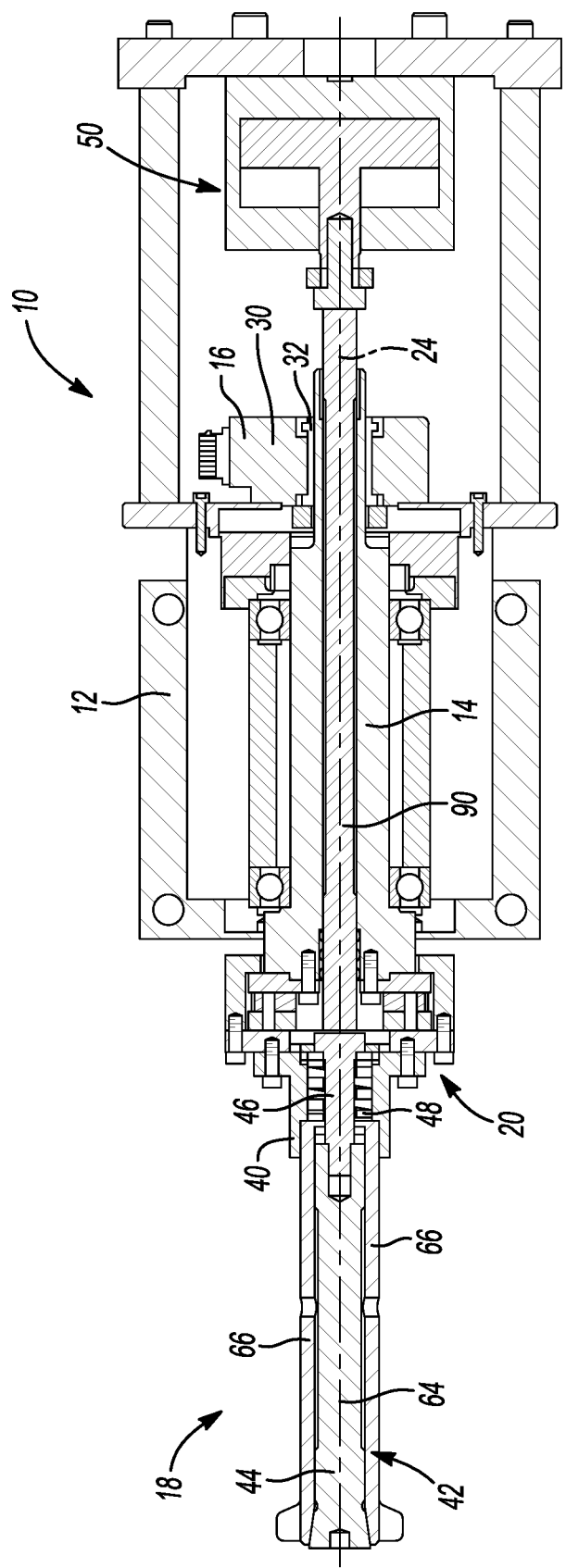
FIG. 1 is a longitudinal cross-sectional view of a spindle assembly constructed in accordance with the teachings of the present disclosure.

With reference to FIG. 1, a spindle assembly constructed in accordance with the teachings of the present disclosure is generally indicated by reference numeral 10. The spindle assembly 10 can include a frame 12, a spindle 14, an encoder 16, a collet assembly 18 and a compliant coupling 20. The frame 12, spindle 14, encoder 16 and collet assembly 18 can be constructed in a conventional manner that is well known in the art. Briefly, the spindle 14 can be high precision spindle that can be coupled to the frame 12 for rotation about a spindle axis 24.

The encoder 16 can have a stator 30, which is fixed to the frame 12, and a rotor 32 that is coupled to the spindle 14 for rotation therewith. The encoder 16 is configured to sense rotation of the rotor 32 relative to the stator 30 and to responsively generate an encoder signal that can be received by a controller (not shown) to determine the rotational position of the rotor 32 of the encoder 16.

Figure 2:
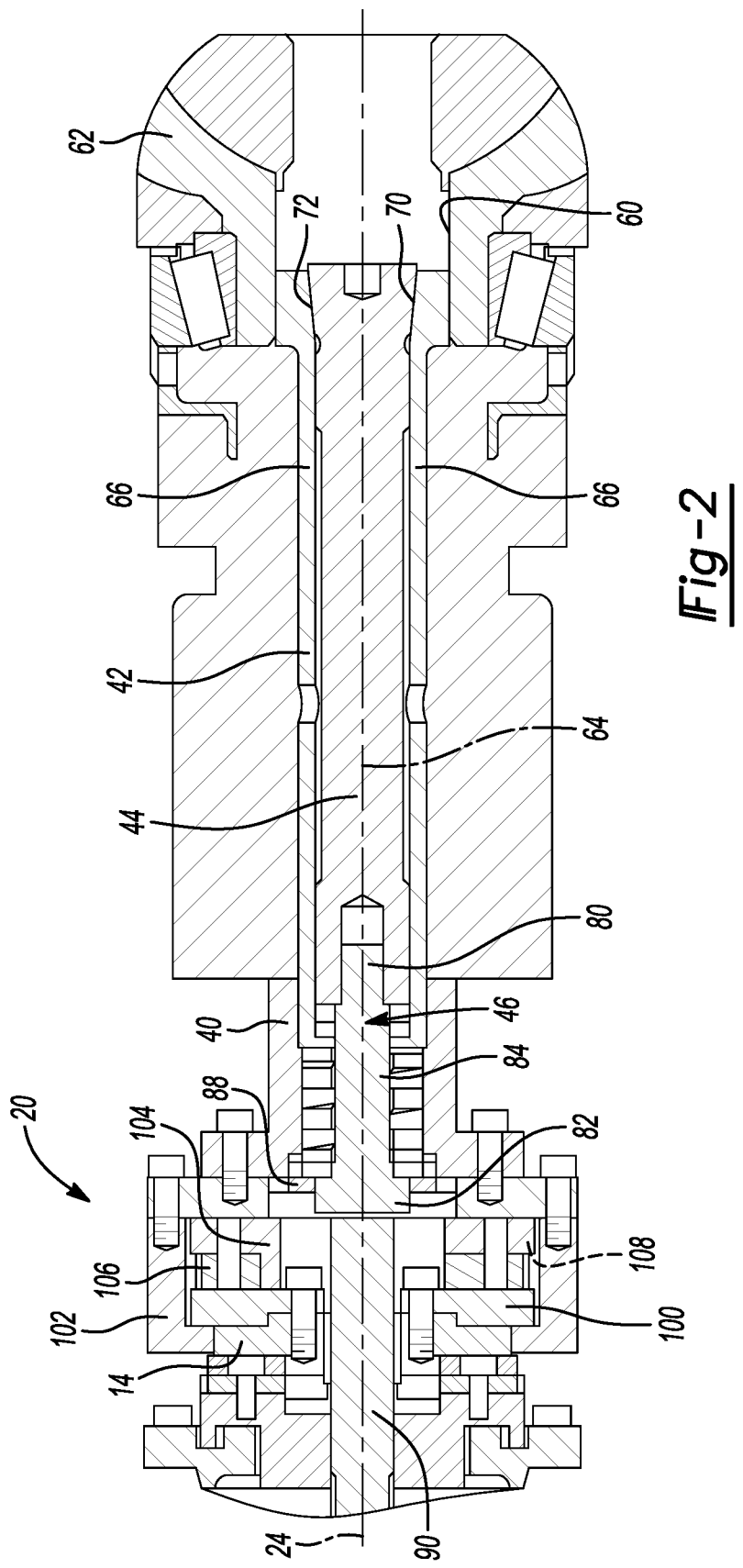
FIG. 2 is a longitudinal cross-sectional view of a portion of the spindle assembly of FIG. 1 in operative association with a differential case.

The collet assembly 18 can have a collet mount 40, a collet 42, an expander 44, a plunger 46, a spring 48 and a linear motor 50. With reference to FIG. 2, the collet 42 can be fixedly coupled to the collet mount 40 and can be configured to engage an inside diametrical surface 60 of a differential case 62. The collet 42 defines a collet axis 64 and a plurality of collet fingers 66 that are movable between a radially inward position, which is smaller than the inside diametrical surface 60 of the differential case 62, and a radially outward position that is radially outward of the radially inward position and sized to engage the inside diametrical surface 60 of the differential case 62. The expander 44 is slidably received in the collet 42 and movable along the collet axis between a first expander position, in which the expander 44 and the collet 42 cooperate to position the collet fingers 66 in the radially outward position, and a second expander position, in which the expander 44 and the collet 42 cooperate to position the collet fingers 66 in the radially inward position. In the example provided, the collet 42 and the expander 44 have mating frusto-conically shaped engagement surfaces 70 and 72, respectively.

The plunger 46 can be coupled to the expander 44 for movement therewith along the collet axis 64. The plunger 46 can include a threaded segment 80, a head 82 and a neck 84. The threaded segment 80 can be threadably coupled to the expander 44. The neck 84 can extend between the threaded segment 80 and the head 82. The head 82 can be non-rotatably but axially slidably coupled to the collet mount 40. In the particular example provided, the head 82 is shaped in a non-round manner and is received into a correspondingly shaped bore 88 in the collet mount 40.

The spring 48 can be disposed between the plunger 46 and the collet mount 40 and can bias the expander 44 toward the first expander position. In the example provided, the spring 48 is a helical compression spring is mounted about coaxially about the neck 84 and abuts the head 82.

The linear motor 50 can be any type of linear motor, such as a pneumatic cylinder, and has a motor output member 90 that is configured to move the expander 44 from the first expander position to the second expander position.

Figure 3:
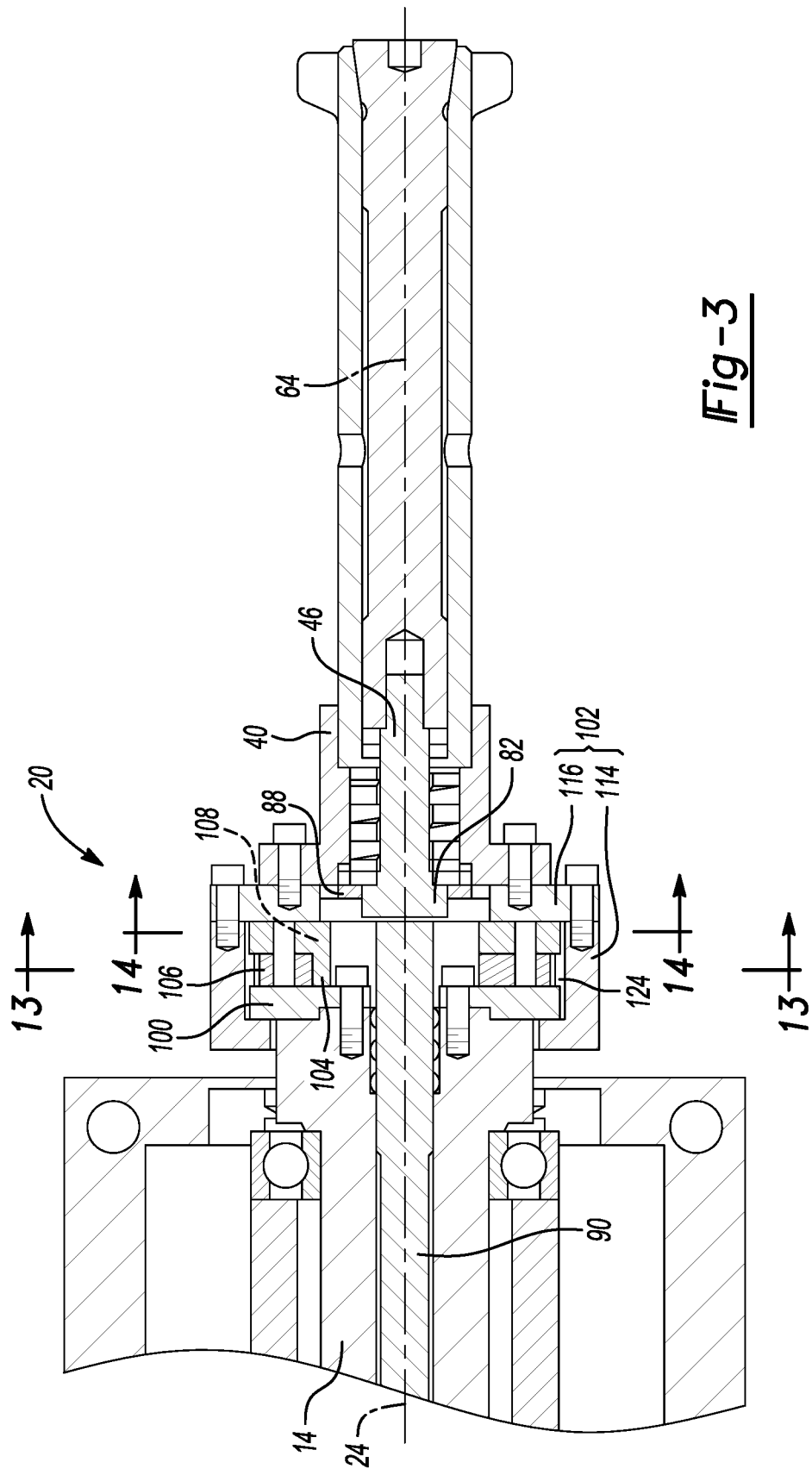
FIG. 3 is an enlarged portion of FIG. 1.
Figure 4:
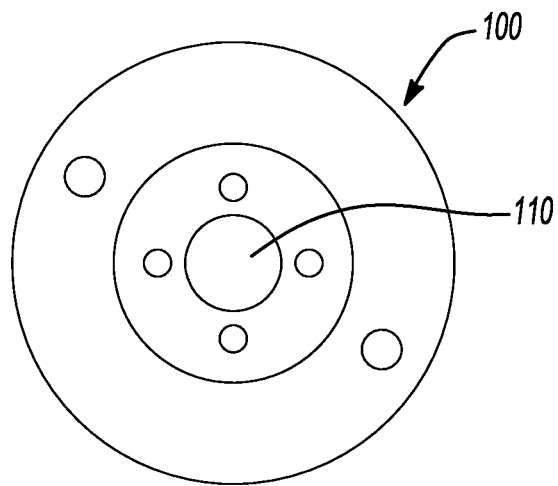
FIG. 4 is a rear elevation view of a portion of the spindle assembly of FIG. 1, illustrating a first coupling member of a compliant coupling.
Figure 5:
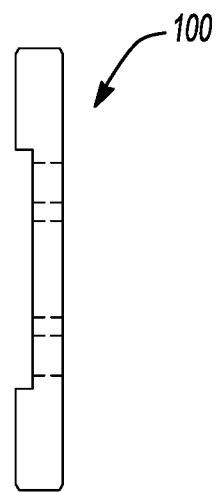
FIG. 5 is a side elevation view of the first coupling member.
Figure 6:
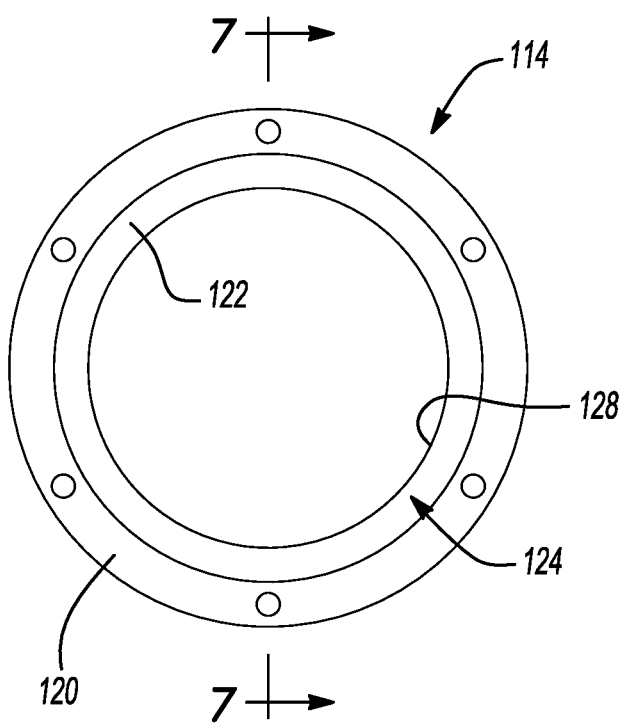
FIG. 6 is a front elevation view of a portion of the spindle assembly of FIG. 1, illustrating a housing of the compliant coupling.

The compliant coupling 20 can include a first coupling member 100, a second coupling member 102, a pivot plate 104, a pair of first link arms 106 and a pair of second link arms 108. The first coupling member 100 can be an annular plate that can be fixedly coupled to the spindle 14. With reference to FIGS. 3-5, the first coupling member 100 can define an aperture 110 through which the motor output member 90 can extend.

Figure 7:
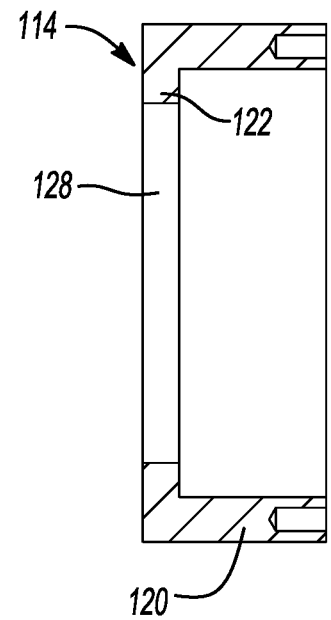
FIG. 7 is a section view taken along the line 7-7 of FIG. 6.

Returning to FIG. 2, the second coupling member 102 can be fixedly coupled to the collet mount 40. In the example provided, the second coupling member 102 comprises a housing 114 and a collet attachment plate 116. The housing 114 can have a circumferentially extending wall member 120 and an annular flange 122. The wall member 120 can define a cavity 124 into which the first coupling member 100, the first link arms 106, the second link arms 108 and the pivot plate 104 can be received. The annular flange 122 can be fixedly coupled to (e.g., unitarily and integrally formed with) a first end of the wall member 120 and can extend radially inwardly therefrom. The annular flange 122 can define a spindle bore or aperture 128 through which the spindle 14 can be received. The aperture 128 can be sized smaller than the first coupling member 100. It will be appreciated that the aperture 128 can be sized relative to the spindle 14 to limit movement of the collet axis 64 relative to the spindle axis 24 within a predetermined zone, which has a circular shape in the example provided. With reference to FIGS. 3, 8 and 9, the collet attachment plate 116 can be fixedly coupled to the collet mount 40 and can be fixedly coupled to a second end of the wall member 120 (FIG. 7) opposite the annular flange 122 (FIG. 7). The collet attachment plate 116 can define an aperture 130 through which the plunger 46 can extend.

With reference to FIGS. 3 and 10-12, the pivot plate 104 is an annular plate that defines a central aperture 150, a pair of first recesses 152 and a pair of second recesses 154. The central aperture 150 is sized to receive the motor output member 90 therethrough. The first recesses 152 are sized to receive the first link arms 106 therein. The first recesses 152 can be formed into a first axial side of the pivot plate 104 and can be spaced symmetrically apart from one another. The second recesses 154 are sized to receive the second link arms 108 therein. The second recesses 154 can be formed into a second, opposite axial side of the pivot plate 104 and can be spaced symmetrically apart from one another. Each of the second recesses 154 can be disposed circumferentially between the first recesses 152.

Figure 13:
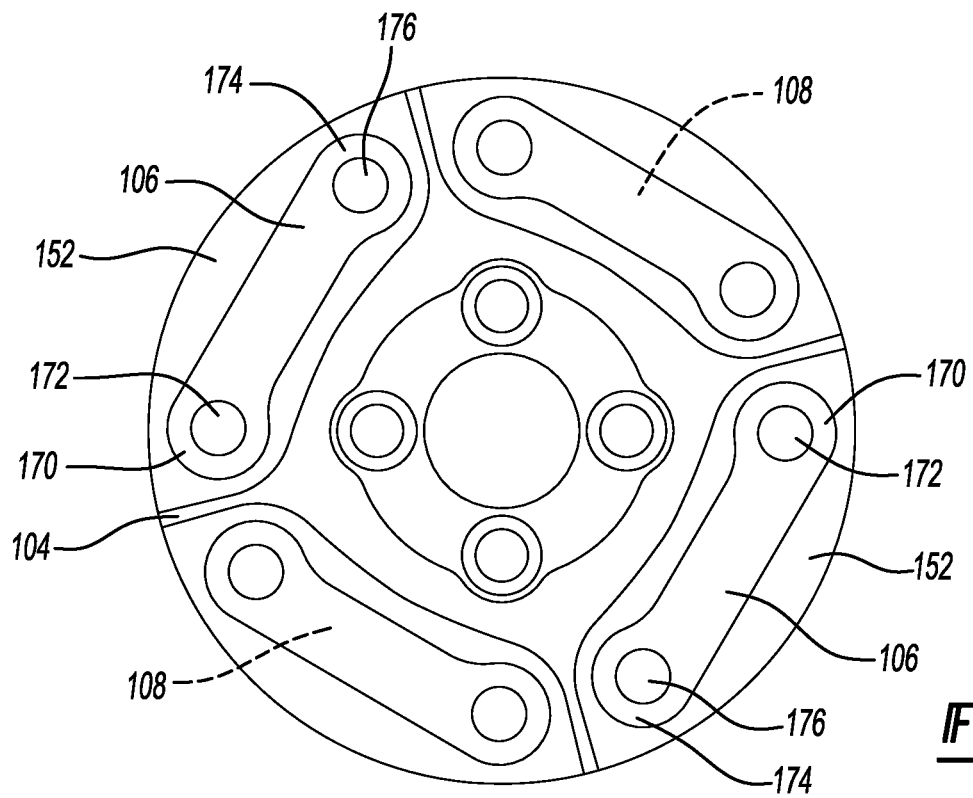
FIG. 13 is a section view taken along the line 13-13 of FIG. 3.

With reference to FIGS. 3 and 13, each of the first link arms 106 is received into an associated one of the first recesses 152 and has a first end 170, which is pivotably coupled to the first coupling member 100 via a first pivot pin 172, and a second end 174 opposite the first end 170 that is pivotably coupled to a first side of the pivot plate 104 via a second pivot pin 176. In the example provided, the first and second pivot pins 172 and 176 are fixedly mounted to the first coupling member 100 and the pivot plate 104, respectively and are slidably received through the first and second ends 170 and 174, respectively, of the first link arms 106 so that the first and second ends 170 and 174 of the first link arms 106 are journally supported by the first and second pivot pins 172 and 176, respectively.

Figure 14:
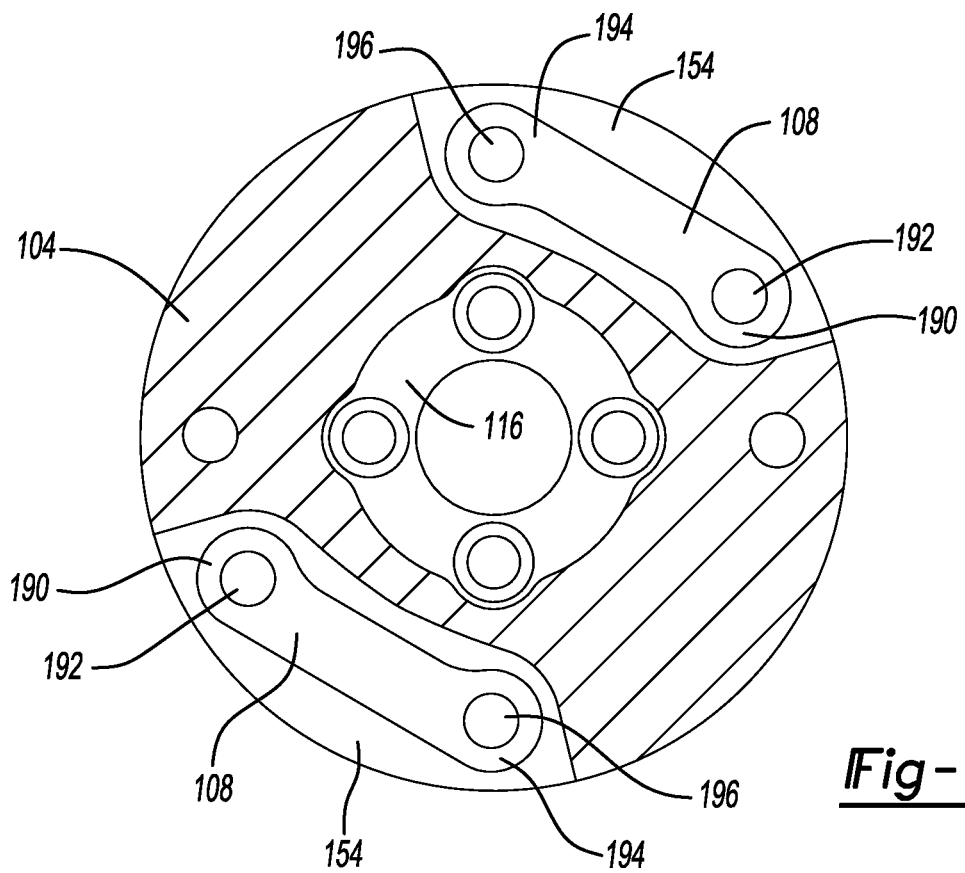
FIG. 14 is a section view taken along the line 14-14 of FIG. 3.

With reference to FIGS. 3 and 14, each of the second link arms 108 is received into an associated one of the second recesses 154 and has a first end 190, which is pivotably coupled to the second coupling member 102 via a third pivot pin 192, and a second end 194 opposite the first end 190 that is pivotably coupled to a second side of the pivot plate 104 via a fourth pivot pin 196. In the example provided, the third and fourth pivot pins 192 and 196 are fixedly mounted to the collet attachment plate 116 and the pivot plate 104, respectively, and are slidably received through the first and second ends 190 and 194, respectively, of the second link arms 108 so that the first and second ends 190 and 194 of the second link arms 108 are journally supported by the third and fourth pivot pins 192 and 196, respectively.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A spindle assembly comprising:
a frame;
a spindle coupled to the frame for rotation about a spindle axis;
an encoder having a stator, which is fixed to the frame, and a rotor that is coupled to the spindle for rotation therewith;
a collet assembly having a collet mount, a collet, an expander, a plunger, a spring, a linear motor and a compliant coupling, the collet being fixedly coupled to the collet mount and configured to engage an inside diametrical surface of a differential case, the collet defining a collet axis and a plurality of collet fingers that are movable between a radially inward position and a radially outward position that is radially outward of the radially inward position, the expander being slidably received in the collet and movable along the collet axis between a first expander position, in which the expander and the collet cooperate to position the collet fingers in the radially outward position, and a second expander position, in which the expander and the collet cooperate to position the collet fingers in the radially inward position, the plunger being coupled to the expander for movement therewith along the collet axis, the spring being disposed between the plunger and the collet mount and biasing the expander toward the first expander position, the linear motor having a motor output member that is configured to move the expander from the first expander position to the second expander position, the compliant coupling comprising a first coupling member, which is fixedly coupled to the spindle, a second coupling member, which is fixedly coupled to the collet mount, a pivot plate, a pair of first link arms and a pair of second link arms, each of the first link arms having a first end, which is pivotably coupled to the first coupling member, and a second end opposite the first end that is pivotably coupled to a first side of the pivot plate, each of the second link arms having a third end, which is pivotably coupled to the second coupling member, and a fourth end opposite the third end that is pivotably coupled to a second side of the pivot plate opposite the first side, wherein each of the second link arms is disposed circumferentially about the pivot plate between the pair of first link arms, wherein at least one of the plunger and the motor output member is received in the compliant coupling.

2. The spindle assembly of claim 1, wherein the collet and the expander have mating frusto-conically shaped engagement surfaces.

3. The spindle assembly of claim 1, wherein the plunger includes a threaded segment, which is threadably coupled to the expander, a head and a neck that extends between the threaded segment and the head, and wherein the spring is mounted about the neck and abuts the head.

4. The spindle assembly of claim 3, wherein the head is non-rotatably coupled to the collet mount.

5. The spindle assembly of claim 1, wherein the second coupling member comprises a housing and a collet attachment plate, the housing defining a cavity into which the first coupling member, the first and second link arms and the pivot plate are received.

6. The spindle assembly of claim 1, wherein the second coupling member defines a spindle bore through which the spindle is received, wherein the spindle bore is sized larger than the spindle to limit movement of the collet axis relative to the spindle axis to a predetermined zone.

7. The spindle assembly of claim 1, wherein the pivot plate defines a pair of first recesses into each of which an associated one of the first link arms is received, and a pair of second recesses into each of which an associated one of the second link arms is received.

8. The spindle assembly of claim 1, wherein the linear motor comprises a pneumatic cylinder.

* * * * *